N. WATERMAN.

Egg Pan and Cake Baker.

No. 2,289.

Reissued June 19, 1866.

Witnesses:
Lawrence Lyons
Arthur Neill

Inventor:
Nath't. Waterman

N. PETERS, Photo-Lithographer, Washington, D. C.

UNITED STATES PATENT OFFICE.

THE RUSSELL & ERWIN MANUFACTURING COMPANY, OF NEW BRITAIN, CONNECTICUT, ASSIGNEES OF NATHANIEL WATERMAN.

IMPROVED EGG-PAN AND CAKE-BAKER.

Specification forming part of Letters Patent No. 23,517, dated April 5, 1859; Reissue No. 2,289, dated June 19, 1866.

*To all whom it may concern:*

Be it known that NATHANIEL WATERMAN, of Boston, in the county of Suffolk and State of Massachusetts, did invent a new or Improved Egg-Pan or Article for Cooking Eggs; and I do hereby declare that the same is fully described and represented in the following specification and the accompanying drawings, of which—

Figure 1:
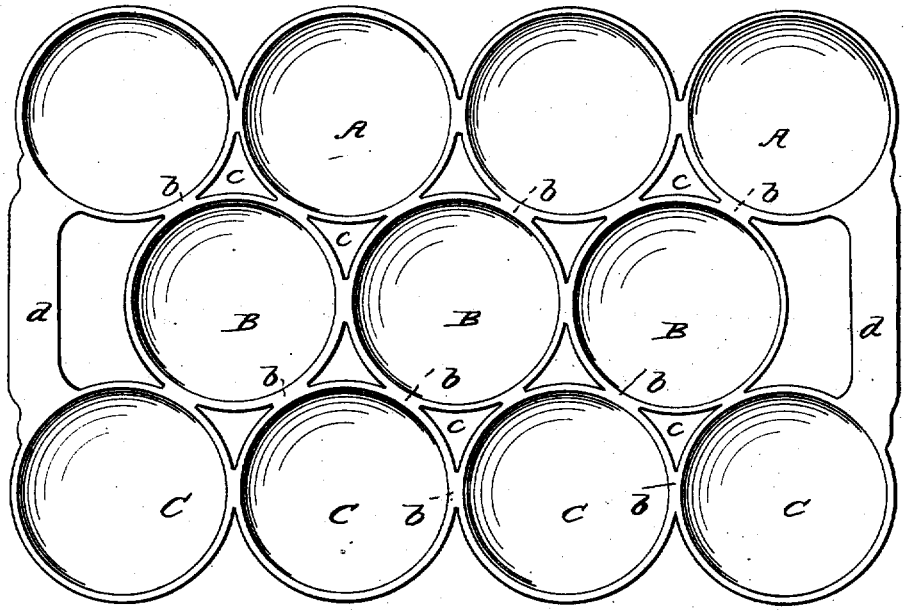
Figure 2:
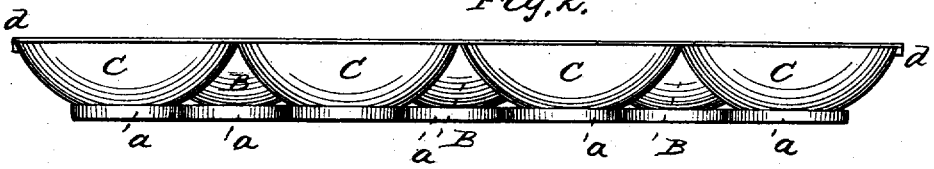

Figure 1 denotes a top view, and Fig. 2 a side elevation, of the same.

The nature of my invention consists in a new or improved manufacture of egg-baking pan as made with the peculiar arrangement of a series of cups and a handle at each end of such series, whereby important advantages are attained.

In the drawings, A A A A B B B C C C C denote eleven cups, which number may be increased or diminished, each of which has a flat and circular bottom, *a*, which, while serving to support the cup, presents a large extent of heating-surface.

In the series here presented the four cups of each outer row are disposed, respectively, opposite the four cups of the other outer row, the middle row of cups being arranged between the two outer rows, so that each cup of the middle row shall be in contact with, or at a like distance from, the four cups of the two outer rows, the said arrangement of cups being particularly shown in the drawings.

Where the rim of each cup is nearest to that of each adjacent cup it is joined to the same by a short connection, *b*, and so as to leave open spaces *c c c* between each of the middle cups and those next contiguous to it. Furthermore, at each end of the series of cups a bar, *d*, extends from the outermost cup A to the outmost cup C, and not only serves as a handle and a means of strengthening the connection of the cups, but as a conveyer of heat from one to the other to which it immediately appertains.

The open spaces *c c c* are left between the cups in order to allow the currents of heat to pass upward between them, and longitudinal transverse and circuitous channels are preserved on the under side of the series and between the cups, so as to equalize the heat against their surfaces on all sides when the baking-pan is placed in an oven and the process of cooking by it is being carried on. The metallic connections of the cups at their points of contact, being heated alike with other portions of the pan, serve as conveyers of heat from one cup to the other, and thereby disseminate the heat equally throughout the series. The handles also aid in the performance of this function.

I would not be understood as confining myself to either the size or form of the pans or cups composing the series, but that they may be of various sizes and forms, whether round, square, oval, or oblong, and whether used for cooking eggs or baking cakes or like uses.

The cups, their connections, and the handles, arranged as described, are to be cast or founded of cast-iron or other metal in one united piece, the whole forming a new or improved cooking utensil of great value in cooking eggs or baking bread or cakes in a uniform manner and to excellent advantage in other respects.

I claim as a new or improved article of manufacture—

The baking-pan or arrangement of cups and a handle at each end of the series, all connected together and cast or founded in one united piece of metal, with heat passages between the cups and longitudinal transverse or circuitous channels on the under side of the same, substantially as hereinbefore described and set forth.

In testimony whereof I have hereunto set my signature.

RUSSELL & ERWIN MFG. CO.,

By L. WOODRUFF, *Secretary*.

Witnesses:

EDWIN T. YOUNGS,

MARTIN S. WIARD.